July 18, 1961  N. G. SCHREWELIUS  2,992,959
PRODUCTION OF SHAPED BODIES FROM HEAT
RESISTANT OXIDATION PROOF MATERIALS
Filed Feb. 20, 1958
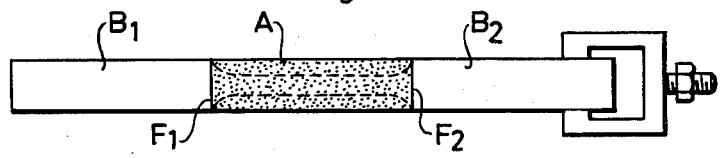
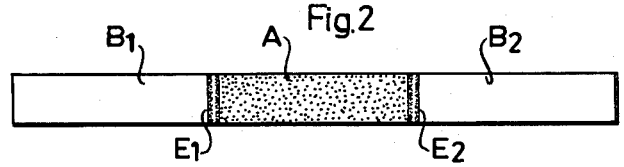
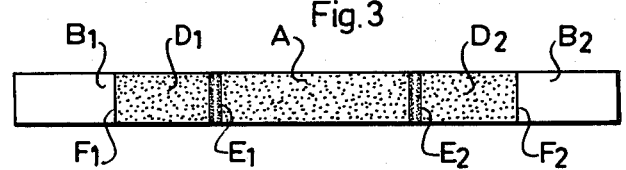
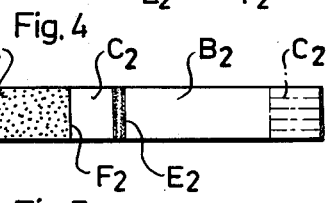
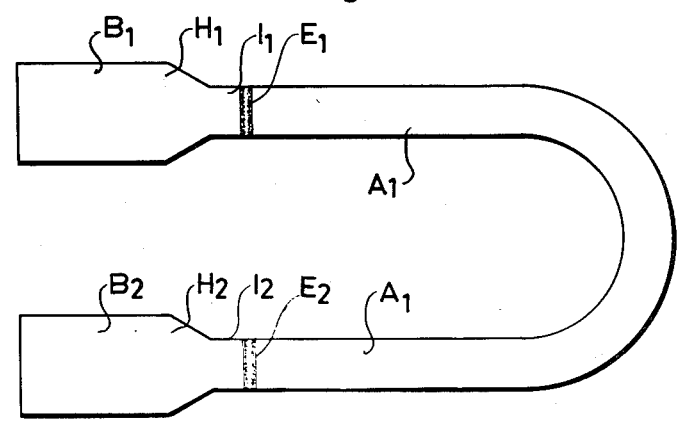
INVENTOR
NILS GUSTAV SCHREWELIUS
BY
Kenyon & Kenyon
ATTORNEYS

# United States Patent Office 2,992,959
Patented July 18, 1961

2,992,959
PRODUCTION OF SHAPED BODIES FROM HEAT RESISTANT OXIDATION PROOF MATERIALS
Nils Gustav Schrewelius, Hallstahammar, Sweden, assignor to Aktiebolaget Kanthal, Hallstahammar, Sweden, a corporation of Sweden
Filed Feb. 20, 1958, Ser. No. 716,415
5 Claims. (Cl. 154—128)

The present invention relates to the production of shaped bodies from heat-resistant oxidation-proof materials powder-metallurgically produced from a silicide or mixed silicides.

Some silicides of the elements of the fourth, fifth and sixth groups in the periodic system of chemical elements possess high melting points, high hardness and good resistance to corrosion. In particular, the excellent resistance to oxidation at high temperatures inherent in silicides has, of late years, gained an increased interest. This oxidation-resisting property is gained owing to the fact that there will form on the surface of the sintered body when heat-treated in an oxidizing atmosphere, a gas-tight film of silicon dioxide (quartz glass). The production of objects for practical use from such silicides may be carried out in accordance with conventional powder-metallurgical methods. From the point of view of mechanical strength silicides are to be considered as comparable with ceramics and as such they are thus lacking in plastic ductility at room temperature, but possess a softening temperature characteristic of each compound of the class. The grain growth occurring in the silicide at this temperature will give rise to a brittleness which makes impossible any further plastic shaping.

It has been proposed to add ceramics powder-metallurgically to silicides. This has been found to involve great difficulties due to undesirable reactions between the silicides and the ceramic additions and also due to the fact that the porosity of the resulting compositions will often be too high. Since the rate of oxidation of any given material may be considered to be proportional to the exposed surface area of the material, and since even a very moderate number of pores in communication with the ambient atmosphere involves a very great increase of the oxidizable surface area, the oxygen attacks will proceed more quickly on a porous composition than on one free from pores since, in the latter case, only the external surface will be subjected to the action of the oxygen. The mechanical strength will also be reduced by porosity.

In cases where compositions from silicides and ceramic additions are to be used as electrical resistance elements, a further problem arises, viz., that of controlling the electrical resistivity (or conductivity) and its coefficient. It will be seen that the electrical conductivity of a composition consisting of a metallic conducting material and an insulator will decrease as the proportion thereof formed by the insulator is increased. At an insulator content of about 70% to 80% by volume the composition will cease to be a metallic conductor because the direct contact between the electrically conducting grains will then be interrupted.

In cases where compositions of silicides and other substances are to be used as heat-resistant structural material, for instance, for blades and other structures in gas turbine power plants, in addition to high strength at the operating temperatures involved, satisfactory resistance to heat-shocks and a certain degree of tenacity at both low and high temperatures are also aimed at. Since the silicides like most other materials are subject to grain growth at high temperatures, and this is, as a rule, accompanied by an increased brittleness, this grain growth must be counteracted, and this may be made, as is well known, by adding materials which, by adopting suitable production processes, will be present at the limits of the range of grain sizes. Attempts to combine silicides with oxides have often aimed at the obtainment of such a grain growth checking effect. However, an addition of oxides will impair the thermal conductivity of the material which in its turn means reduced resistance to heat-shocks. Such compositions of silicides and oxides, in spite of the high values of their tensile and compressive strengths, display an increased brittleness, especially at the relatively lower temperatures.

It is well-known in the art that particles covered with surface films of the identical kind are capable of "wetting" each other when used in powder-metallurgical sintering reactions. It is possible, by a controlled and well-defined oxidation brought about during the sintering procedure, to establish a sintering-promoting silicon dioxide layer of suitable thickness on the surfaces of the components to thereby attain low porosity and improved characteristics. It would also be convenient in certain cases to admix particularly finely granulated $SiO_2$.

The present invention relates more particularly to the production of electrical resistance elements of the type having an incandescent heating section in strand, strip or similar form, and terminal end sections associated with said heating sections, said terminal sections being designed for operation in a cooler condition and having a lower electrical resistance than said heating sections. The material of these elements consists mainly of $MoSi_2$ and further contains additions effective to prevent grain growth at elevated temperatures, such as silicides of Ta, Nb, V, Cr and Ti, and ceramic materials in the form of oxides of, for instance, Si and Al.

According to the present invention there is provided a process of producing a shaped body in a powder-metallurgical way from a heat-resistant, oxidation-proof material consisting wholly or mainly of molybdenum disilicide, characterized in that the material, upon being provisionally shaped, is sintered to two steps in such a way that, in the first step, it is sintered in a protective atmosphere at a temperature which is lower than the operating temperature of the heat-resistant body, and, further, that, in a second step, said material is heated in air at a temperature corresponding to the highest operating temperature of the finished material, such as 1600° C. silicon dioxide being then formed which fills out the remaining pore cavities in the body and also aids sintering of the material and further produces a thin film consisting substantially of quartz glass on the surface of the heat-resistant body which is thereby protected against further oxidation.

A material produced from molybdenum disilicide and tantalum disilicide is excellent for use as a heat-resistant construction material for heating or incandescent parts in cases where there is a high demand for great mechanical strength as well as permanence against corrosion at elevated temperatures, such as in gas turbine power plants, for example. Further it has been established that such a material may be employed, to great advantage, as an electrical resistance material owing to its high melting point, its good permanence against oxidation, its suitable coefficient of electrical resistivity, and the substantial invariability of its electrical resistivity at elevated temperatures.

By sintering together an incandescent or heating section with a pair of terminal end sections it is possible, in addition, to manufacture a combined or composite heating or resistance element. In this case the various sections are provided individually and separately with a surface layer or film of silicon dioxide in the manner stated hereinbefore. Subsequently these sections are integrated by subjecting the same to a sintering process. In this way there will be obtained an integral heating element having a surface film of silicon dioxide.

The heat-resistant material in addition, has been found to be moldable under heat whereby it is readily formed into helices, folded strips or the like so that the material will be particularly adapted for use as heating elements in electrical furnaces and other electrical heating apparatus.

In the course of researches and investigations carried out in connection with the development of the present invention it has also been possible to establish that molybdenum disilicide, $MoSi_2$, and tantalum disilicide, $TaSi_2$, are capable of forming a solid solution. The crystal structure of pure tantalum disilicide will then be maintained up to a solution containing about 60% by weight of molybdenum disilicide and 40% by weight of tantalum disilicide. The crystal lattice of this silicide mixture is slightly smaller than that of pure tantalum disilicide. Thus by measurement the hexagonal crystal axes were found to be: $a=4.66$ A.U. and $c=6.48$ A.U., the corresponding values for pure tantalum disilicide being: $a=4.77$ A.U. and $c=6.55$ A.U.

As already stated in the foregoing, the heat resisting properties of the material according to the invention are very advantageous. In fact, the resistance to oxidation of the material is so high that the material is usable at temperatures higher than 1600° centigrade.

The silicide mixture has been found to be consistent also in the presence of moderate, and also in the presence of comparatively large amounts of associated silicides of metals such as columbium and vanadium without any discontinuous changes in its properties. When such silicides are present the changes involved will primarily be in respect of the electrical characteristics of the heat-resistant material.

However, the resistance to oxidation of the material or alloy has been found to decrease with increasing percentages of columbium and vanadium.

The heat-resistant material is produced powder-metallurgically. The physical characteristics of the material are dependent, in addition to the chemical composition thereof, on the process adopted for its production, in that the physical properties will depend on the grain size and graduation of the original powders used, on the method of mixing the original powders, and on the processes employed for the shaping. The degree of porosity of the product in the various stages of the production is of critical importance.

It would be suitable, as a rule, to add a binder, preferably an aluminium silicate or $SiO_2$ in a very finely divided form, to the pulverulent original materials.

In conjunction with the two-stage sintering of the material the softening conditions are of interest, and in a pending patent application Serial No. 434,124, filed June 3, 1954, a material based on the system $MoSi_2$—$TaSi_2$ is subjected to a closer study. The present application is a continuation in part of said pending application.

The softening temperature, i.e. the temperature at which a test bar will just flex under a test load, will initially decrease rapidly when the amount of $TaSi_2$ is increased. At approximately 10% by weight of $TaSi_2$ the softening temperature is so low as to enable the silicide mixture, being suitably produced in the form of a wire or strip, to be bent and shaped already at 1500° centigrade. The softening temperature of the material may also be modified otherwise than by altering the basic composition of the material, for instance by sintering in two or more steps. The possibility of plastic shaping under heat is of great technical importance, particularly when the production of helices, folded strips or the like intended to be used as electrical heating resistors is concerned. On the other hand, the inclusion of percentages higher than 25% by weight of $TaSi_2$ will cause the softening temperatures of the silicide mixture to be higher than that of $MoSi_2$ alone. The softening temperature then increases as the tantalum content is further increased, and to an extent such as to reach a value as high as approximately 1800° centigrade at a proportion of 40% by weight of $TaSi_2$. This elevated softening temperature has a great technical value, especially when the material is to be used in the production of electrical heating resistors, since it will be possible to use element assemblies without the usual ceramic brickwork supports also at the highest temperatures which the resistance material is able to withstand without rapidly getting oxidized or otherwise destroyed.

The plasticity at high temperatures obtained upon minor inclusions of oxides and/or $TaSi_2$ is highly dependent not only on the grain size, but also of the amount of additions present in the mass. Even a very small content of $SiO_2$, will not only affect the sintering process proper in that a lower degree of porosity will be attained, but will entrain the additional effect that a portion of the tantalum disilicide added will react with the silica causing the formation of a ceramic product of good heat refractory properties and resistance to oxidation. This product as well as silica is effective to decelerate the grain growth of the silicides which is of decisive importance in order that the alloy shall be moldable.

In most cases it is possible to utilize the moldability under heat in the production of incandescent or heating sections in the final shape of helices or creased thin strips. Thus the material is first shaped into the form of wires, tubes or strips by being extruded in a plastic state after mixing with binders, after which the material is dried and pre-sintered in a protective atmosphere at a relatively low temperature, whereby an intermediate product of a low softening temperature will be obtained. The material is then formed under heat into helices or creased strips or into other final shapes, as desired. The final sintering is effected in air at a suitable higher temperature such as, for instance 1600° centigrade, during which operation silica or mixed oxides are formed which will fill up the remaining pores and form a surface film of $SiO_2$. Then the sintering together with the terminal sections is carried out.

In the following a few examples will be given of compositions of the material suitable for the present invention, and indicating also some important characteristic properties of said materials.

*Composition No. I*

| | Percent by weight |
|---|---|
| $MoSi_2$ | 80 |
| $TaSi_2$ | 6.5 |
| $SiO_2$ | 8.5 |

The remainder consisting of oxides and silicides of Al, Fe, Nb.

Characteristics:
Refractory up to approximately _____ 1750° C.
Softening temperature after pre-sintering, about ____ 1420° C.
Softening temperature after final sintering, about ____ 1700° C.
Elec. resistivity at 20° C. __ .6 ohm/sq.mm./meter.
Elec. resistivity at 1300° C.__ 3.3 ohms/sq.mm./meter.
Elec. resistivity at 1600° C.__ 3.8 ohms/sq.mm./meter.

*Composition No. II*

| | Percent by weight |
|---|---|
| $MoSi_2$ | 70 |
| $TaSi_2$ | 21 |
| $SiO_2$ | 5 |

The remainder consisting of oxides and silicides of the metals Fe, Al, Nb in the form of impurities and binders.

Characteristics:
Refractory up to _____ 1750° C. to 1800° C.
Softening temperature ____ >1700° C.
Elec. resistivity at 20° C. __ 1.3 ohms/sq.mm./meter.
Elec. resistivity at 1300° C._ 3.1 ohms/sq.mm./meter.
Elec. resistivity at 1600° C._ 3.2 ohms/sq.mm./meter.

The electrical characteristics of mixed disilicides of molybdenum and tantalum are strongly dependent on the chemical composition of the material or alloy as indicated in our copending patent application Serial No. 434,124.

*Composition No. III*

|  | Percent |
|---|---|
| $MoSi_2$ | 80 to 96 |
| Oxide component (composed of 20 to 4% $SiO_2$ and 3 to 0% $Al_2O_3$) | 20 to 4 |

Characteristics:
Refractory up to _____ greater than 1700° C.
Softening temperature ____ 1400° C. after presintering, 1650° C. after final sintering in a few hours.
Elec. resistivity at 20° C. __ 0.4 ohm/sq.mm./meter.
Elec. resistivity at 1300° C._ 3.2 ohms/sq.mm./meter.
Elec. resistivity at 1600° C._ 3.8 ohms/sq.mm./meter.

In manufacturing the Compositions Nos. I to II above the raw materials, i.e. $MoSi_2$ and $TaSi_2$ and further a finely divided ceramic binding means, such as $SiO_2$ or an aluminum silicate, are mixed and ground down to a grain size less than 10 micra whereupon the mixture is formed, for instance, by extrusion. The presintering is made in pure hydrogen at a temperature varying between 1000 and 14000° C., preferably 1300 °C. The final sintering then takes place in air at a temperature of from 1400 to 1700° C., preferably 1600° C. The final sintering may be made under five minutes; the heating being produced by passing electric current through the material. In this final sintering a considerable oxidation takes place as set forth above and thereby the content of $SiO_2$ is increased by some 5% by weight of the material. The statements in Compositions Nos. I and II regarding the values of softening temperature after final sintering relate to the values after the material has been treated in air at the final sintering temperature during a comparatively long interval of time, such as a few hours. In the final sintering in air there is produced a film of silica glass on the exterior surface of the material as well as to a certain degree also between the individual silicide particles and this silica glass film is illustrated in the attached microphotos. The degree of porosity is a point of consideration and it should be noted that in respect of the Compositions Nos. I and II the porosity will be reduced during the final sintering from 15 to 20% by volume of the material down to 0 to 5%.

In manufacturing the Composition No. III the starting material is made sufficiently plastic and put in an extrusion press, from which rods of desired length and 7 to 14 mm. thickness are extruded. The rods are dried and presintered under pure hydrogen (containing at most 0.5% by volume $O_2$) at 1000° C. and then pushed through a furnace at 1200 to 1400° C. also under pure hydrogen after which treatment they have strength enough to be handled. The porosity of the rods is now 15 to 20% by volume and at a preferred composition of the starting material a typical analysis will be 59.7% Mo, 36.0% Si, 0.7% Al, 0.7% Fe and 0.2% impurities the balance being 2.7% O. The mineralogical composition is 93% by weight $MoSi_2$ and 6% by weight ceramic glass, mainly aluminum silicate, and the balance impurities.

The presintered rods are now passed by direct current to be heated and sintered a few minutes in air at 1600° C. The product has 0 to 5% porosity corresponding to a density of 5.6 grams/cm.$^3$. The bending strength at room temperature is 50 kgs./mm.$^2$ as compared with about 20 kgs./mm.$^2$ for pure $MoSi_2$. A typical analysis will now be 57.7% Mo; 34.9% Si; 0.7% Al; 0.7% Fe and 0.2% impurities, the balance being 5.8% oxygen. The mineralogical composition is 90% by weight $MoSi_2$ and 10% by weight ceramic glass. The glass phase is a reaction product substantially of $Al_2O_3$ and $SiO_2$ formed during the oxidation. The ceramic glass component is very important as it stops efficiently the grain growth of the silicide at high temperature. At 1600° C. the rods being freshly sintered in air can be formed into any desired shape. After a few hours, however, some reaction takes place in the material the practical result of which is that it cannot be formed any more and thus retains its shape.

Referring to FIGS. 1 to 5 of the drawing, these figures are illustrative of a few structural forms of electrical heating elements made according to the present invention.

FIG. 1 illustrates a rod of a length of, for example, 20 in. which has been pressed from different original mixtures in such a manner as to obtain an intermediate or central section A of a length of about 4.7 in. and made of a material according to type I, whilst the two end sections $B_1$ and $B_2$ of 7.5 in. each are made of a material according to type III. Temperature differences between the central section and the end sections is obtainable by the action of reducing the central section A of the rod, for instance, by grinding, after the pre-sintering process, as indicated by dashed lines, so as to impart to this section a cross-sectional area being, for example, only half that of the end sections, whereby, when a current flow is passed through the rod the end sections will attain temperatures of such low values that special arrangements for cooling the end sections can be dispensed with. The central section A may, thermally, be referred to as an "incandescent section" and the end sections may be referred to as "cold sections."

It has also been possible by selecting suitable compositions to produce continuous rods of a predetermined required or suitable distribution of its electric resistance per unit length of the rod, and nevertheless to maintain its cross sectional area uniform throughout, which is of importance from technical and economical points of view.

A combination of different silicide compounds may be obtained according to FIG. 2 by joining, in a pressure sintering process, finally sintered rod sections, $B_1$, A and $B_2$ of different compositions, such as those mentioned in respect of FIG. 1, possibly while using a pulverulent welding material in the joints proper $E_1$ and $E_2$. Said pulverulent welding material should either be of a composition identical with that of one of the rod sections, or of a composition being a mixture of the pulverulent original materials from which the two different rod sections were produced. The two rod end sections may then be abutted and pressed together against the middle section while increasing the temperature whilst the region of abutment $E_1$ and $E_2$ between the same is maintained in a graphite mold suited for the purpose.

It is true that the process just mentioned involves a considerably more costly method of combining silicide compounds of different compositions than that described in conjunction with FIG. 1, however, the same may be advantageous where rods of particularly great lengths are to be produced. Thus, it has been found to be readily possible by the use of a similar method to produce, for instance (see FIG. 3), a rod of a total length of 47.3 in. having an incandescent section $D_1$—A—$D_2$ of a length of 31.5 in., and end sections $B_1$ and $B_2$ of a length of 7.9 in. each. Such a rod may be made up of three rod elements, viz. $B_1$—$D_1$, A and $D_2$—$B_2$, each of a length of about 15.75 in. The rod elements are joined together by means of a powder material at the joints on abutment faces $E_1$ and $E_2$. The element A, in the example illustrated in FIG. 3, is made of a uniform powder of a material according to type II, whilst the two other sections, $B_1$—$D_1$ and $D_2$—$B_2$ are jointed centrally intermediate their ends, at $F_1$, $F_2$, the portions $D_1$ and $D_2$ situated inwardly thereof being of a composition identical with that of the central section A, and the portions $B_1$ and $B_2$ situated outwardly of said joints $F_1$, $F_2$, respectively, made of a powder of type III. After having carried out the joints $E_1$ and $E_2$ with the first mentioned element A centrally disposed and the two heterogeneous end elements $B_1$—$D_1$ and $D_2$—$B_2$ disposed at the ends, a rod will be obtained which when having a uniform cross-sectional area of 0.31 sq. in. and when used as an electrical heating element will attain sufficiently low temperature at its ends to enable any special cooling arrangements to be dispensed with.

In the embodiment illustrated in FIG. 4 the intermediate rod section is of heterogeneous structure having a portion A made of a material of type II and two end sections $C_1$ and $C_2$ made of a material of type III. The outer rod sections $B_1$ and $B_2$ are made of a material of type III. Thus, in this case the incandescent section is delimited to the section A whilst the cold sections $B_1$—$C_1$ and $C_2$—$B_2$ comprise, in addition to the whole of the respective end rod sections, also the adjacent portions of the central rod section. Thus, the joints $E_1$ and $E_2$ interconnecting the rod elements will be situated within the cold sections whilst the "fusion" joints $F_1$ and $F_2$ between the different structural compositions are disposed within the central rod section.

The composition of the incandescent section A or $D_1$—A—$D_2$ and of the cold sections $B_1$, $B_2$ or $B_1$—$C_1$, $C_2$—$B_2$, are chosen so as to cause the coefficient of electrical resistivity to be lower within the cold sections than within the incandescent section. When upon current flow through the element the temperature increases in the incandescent section, heat will also be transferred through the joints $F_1$, $F_2$ into the cold sections. This will also increase the resistance within the cold sections, and in this way, within the portions $B_1$, $B_2$ or $C_1$, $C_2$, respectively, thereof disposed adjacent to the joints $F_1$ and $F_2$, respectively, interconnecting the same with the incandescent section, a continuous temperature gradient will develop having a uniform slope from the temperature of the incandescent section to the temperature of the terminals. As in most cases there will prevail a sharp temperature difference between the different materials the choice of composition above referred to involves an advantage from the technical point of view in that the rod will not be subjected to any substantial thermal stresses. It has been found by practical tests that a joint between a material of type III and a mixed material of type II can withstand a temperature of 1650° centigrade for more than 1000 hours.

According to FIG. 5 the resistance element is composed by an incandescent section $A_1$ in the shape of a U-bent rod with a constant circular cross section with a diameter of 0.25 in. and a length of 40 in. The end sections $B_1$ and $B_2$ are cylindrical with a diameter of 0.5 in. and a length of 8 in. each. All the sections are made of the same composition No. III. In making this element the incandescent section $A_1$ is originally straight and is subjected to the sintering in two steps and, while being finally sintered in air, it is formed to a resistance loop, for instance of the hairpin type indicated on the drawing. This is, of course, only illustrated as an example as the actual shape thereof which may be in the form of a spiral, a folded band, meanders et cetera, is not concerned in the present invention. Anyhow, the forming of this section may be made in a time of 5 minutes at a temperature of 1500 to 1600° C. the composition being at the same time finally sintered and obtaining a silica glass film and the porosity decreasing to a value near 0. The connecting sections $B_1$ and $B_2$ being initially separate from section $A_1$ are in this case straight and are also sintered in two steps by being passed by electric current. To render it possible to join the sections $B_1$ and $B_2$ with the section $A_1$ by means of resistance butt welding, the one ends $H_1$ and $H_2$ of the sections $B_1$ and $B_2$ are ground down to a tapered form so far that their transversal dimensions will be the same as those of the corresponding ends of the incandescent section $A_1$. As the transition from the large dimensions of the end sections $B_1$ and $B_2$ to the small dimensions of the section $A_1$ must not be too sharp the axial length of the zones $H_1$ and $H_2$ is about 1 in. To provide for that the development of heat at the joints $E_1$ and $E_2$ will be as uniformly distributed as possible on both sides thereof it is further preferable that the abutting portions $I_1$ and $I_2$ of the tapered ends $H_1$ and $H_2$ of sections $B_1$ and $B_2$ has the same constant cross section as the incandescent zone $A_1$ i.e. a diameter of 0.25 in. The joining at $E_1$ and $E_2$ takes place preferably under the protection of an argon atmosphere. The element then combined of sections $B_1$—A—$B_2$ will have a superficial silica glass film except on those places $H_1$—$I_1$ and $H_2$—$I_2$ where the sections $B_1$ and $B_2$ have been ground. When the element is then operated at a temperature of about 1600° C. of the incandescent section $A_1$ the temperature in the tapered zones $H_1$—$I_1$ and $H_2$—$I_2$ will exceed 1200° C. thanks to the good heat conductivity of the material so that also the zones $H_1$—$I_1$ and $H_2$—$I_2$ will obtain quickly a protecting silica glass film.

The extreme end portions $G_1$ and $G_2$ of the cold sections may, as shown by way of example in FIG. 4, be provided with a metallic impregnation of copper or silver in a manner well known in the art and they will thereby afford an increased electric conductance resulting in a reduced development of heat in said portions upon being passed by a current therethrough whereby a relative cooling effect is attained. Thus, the rod of FIG. 4 as well as the rods illustrated in FIGS. 1, 2, 3 and 5 may be composed of three different kinds of sections or portions, viz. a central incandescent section, such as A, which is sharply delimited relative to two intermediate portions, such as $B_1$—$C_1$ and $C_2$—$B_2$, of a composition corresponding to type III and two extreme end portions $G_1$ and $G_2$ containing this composition plus copper or silver. Thus, the intermediate portions $B_1$—$C_1$ and $C_2$—$B_2$ directly abut the hot incandescent section and, therefore, can be considered as buffers between the incandescent section and the cooler metal impregnated extreme end portions $G_1$ and $G_2$. The incandescent section, thus, will not immediately contact the solid copper conductor which is an essential feature since metallic copper is heat sensitive.

I claim:
1. A shaped body prepared from heat-resistant oxidation-proof material consisting mainly of molybdenum disilicide, said body being formed of at least two separate parts sintered together to form an integral body surrounded in its entirety by a protecting quartz glass film, said body being composed of finely divided sintered particles of molybdenum disilicide with silicon dioxide substantially completely filling the pores between the particles of molybdenum disilicide to form a substantially non-porous body.

2. The process of producing a shaped body from a heat-resistant, oxidation-proof material consisting mainly of molybdenum disilicide by powder metallurgy, comprising shaping said material, presintering said shaped material in an inert non-oxidizing atmosphere at a temperature in the range 1000 to 1400° C. to produce a porous body, thereafter further sintering said presintered body in an oxygen-containing atmosphere at a temperature in the range 1400 to 1700° C. to form silicon dioxide which aids in the sintering of the material and which further produces a thin film consisting substantially of quartz glass on the surface of the heat-resistant body which is thereby protected against further oxidation.

3. The process according to claim 2 wherein at least two separate parts are made by said process, and said parts are sintered together to form an integral body which thereby is surrounded in its entirety by a protecting quartz glass film.

4. The process of claim 2 wherein the body is made from several parts which are shaped and put together before presintering.

5. A process according to claim 3, wherein there are at least three separate parts sintered together, including two end portions and a central section, in which the material of the end portions has an electrical resistance which is more temperature sensitive than that of the material of the central section.

References Cited in the file of this patent

UNITED STATES PATENTS

| | | |
|---|---|---|
| 1,904,049 | Hoyt | Apr. 18, 1933 |
| 2,779,580 | Steinitz | Jan. 29, 1957 |

FOREIGN PATENTS

| | | |
|---|---|---|
| 716,604 | Great Britain | Oct. 13, 1954 |
| 780,735 | Great Britain | Aug. 7, 1957 |